United States Patent
Kaushik et al.

(10) Patent No.: US 9,026,512 B2
(45) Date of Patent: May 5, 2015

(54) DATA OBJECT SEARCH AND RETRIEVAL

(75) Inventors: Akhil Kaushik, Sunnyvale, CA (US);
Subramanian Periyagaram, Sunnyvale, CA (US); Jian Xing, Antioch, CA (US);
Rangarajan Suryanarayanan, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 470 days.

(21) Appl. No.: 11/207,596

(22) Filed: Aug. 18, 2005

(65) Prior Publication Data

US 2007/0043715 A1     Feb. 22, 2007

(51) Int. Cl.
*G06F 7/00* (2006.01)
*G06F 17/30* (2006.01)

(52) U.S. Cl.
CPC .... *G06F 17/30864* (2013.01); *G06F 17/30386* (2013.01)

(58) Field of Classification Search
USPC ............ 707/104.1, 100, 10, 4, 999.1, 999.01, 707/705
See application file for complete search history.

(56) References Cited

U.S. PATENT DOCUMENTS

| | | | |
|---|---|---|---|
| 4,875,159 A * | 10/1989 | Cary et al. | 1/1 |
| 5,233,513 A | 8/1993 | Doyle | |
| 5,280,612 A * | 1/1994 | Lorie et al. | 1/1 |
| 5,287,496 A * | 2/1994 | Chen et al. | 1/1 |
| 5,303,042 A | 4/1994 | Lewis et al. | |
| 5,371,851 A | 12/1994 | Pieper et al. | |
| 5,403,639 A | 4/1995 | Belsan et al. | |
| 5,481,701 A | 1/1996 | Chambers, IV | |
| 5,625,818 A | 4/1997 | Zarmer et al. | |
| 5,627,974 A | 5/1997 | Watts et al. | |
| 5,675,510 A | 10/1997 | Coffey et al. | |
| 5,684,991 A | 11/1997 | Malcolm | |
| 5,761,680 A | 6/1998 | Cohen et al. | |
| 5,905,988 A | 5/1999 | Schwartz et al. | |
| 6,021,437 A | 2/2000 | Chen et al. | |
| 6,052,780 A | 4/2000 | Glover | |
| 6,141,686 A | 10/2000 | Jackowski et al. | |
| 6,173,325 B1 | 1/2001 | Kukreja | |
| 6,182,286 B1 * | 1/2001 | Sigal et al. | 717/122 |
| 6,185,686 B1 | 2/2001 | Glover | |

(Continued)

FOREIGN PATENT DOCUMENTS

| WO | WO 2004/047078 | 6/2004 |
|---|---|---|
| WO | 2004111765 A2 | 12/2004 |

OTHER PUBLICATIONS

Berners-Lee et al., "Uniform Resource Identifier (URI): Generic Syntax," Standards Track, Jan. 2005, Network Working Group.

(Continued)

*Primary Examiner* — Hosain Alam
*Assistant Examiner* — Eliyah S Harper
(74) *Attorney, Agent, or Firm* — Van Pelt, Yi & James LLP

(57) ABSTRACT

Searching data is disclosed. A searchable index is used to determine which, if any, data objects comprising a set of backup data are responsive to a search query. For the search query, a search result is generated. The search result includes, in the event a first data object that is responsive to the search query comprises a version of one or more other data objects that are responsive to the search query, data indicating that the first data object comprises a version of said one or more other data objects.

39 Claims, 6 Drawing Sheets

(56) References Cited

U.S. PATENT DOCUMENTS

| | | |
|---|---|---|
| 6,212,512 B1 | 4/2001 | Barney et al. |
| 6,223,343 B1 | 4/2001 | Hopwood et al. |
| 6,253,321 B1 | 6/2001 | Nikander et al. |
| 6,256,773 B1 | 7/2001 | Bowman-Amuah |
| 6,324,581 B1 | 11/2001 | Xu et al. |
| 6,351,776 B1 | 2/2002 | O'Brien et al. |
| 6,351,847 B1 | 2/2002 | Sakamoto et al. |
| 6,397,379 B1 | 5/2002 | Yates et al. |
| 6,405,049 B2 | 6/2002 | Herrod et al. |
| 6,415,300 B1 | 7/2002 | Liu |
| 6,434,680 B2 | 8/2002 | Belknap et al. |
| 6,453,343 B1 | 9/2002 | Housel et al. |
| 6,453,354 B1 | 9/2002 | Jiang et al. |
| 6,460,055 B1 | 10/2002 | Midgley et al. |
| 6,549,959 B1 | 4/2003 | Yates et al. |
| 6,549,992 B1 | 4/2003 | Armangau et al. |
| 6,591,377 B1 | 7/2003 | Evoy |
| 6,606,694 B2 | 8/2003 | Carteau |
| 6,658,465 B1 | 12/2003 | Touboul |
| 6,751,604 B2 | 6/2004 | Barney et al. |
| 6,763,452 B1 | 7/2004 | Hohensee et al. |
| 6,769,071 B1 | 7/2004 | Cheng et al. |
| 6,779,107 B1 | 8/2004 | Yates |
| 6,789,181 B1 | 9/2004 | Yates et al. |
| 6,802,025 B1 | 10/2004 | Thomas et al. |
| 6,839,721 B2 | 1/2005 | Schwols |
| 6,845,486 B2 | 1/2005 | Yamada et al. |
| 6,861,951 B2 | 3/2005 | Reghetti et al. |
| 6,868,495 B1 | 3/2005 | Glover |
| 6,912,642 B2 | 6/2005 | Nishikawa |
| 6,915,456 B2 | 7/2005 | Banerjee et al. |
| 6,934,832 B1 | 8/2005 | Van Dyke et al. |
| 6,941,545 B1 | 9/2005 | Reese et al. |
| 6,954,923 B1 | 10/2005 | Yates et al. |
| 6,973,455 B1 | 12/2005 | Vahalia et al. |
| 6,978,462 B1 | 12/2005 | Adler et al. |
| 6,983,287 B1 | 1/2006 | Jayanti et al. |
| 6,983,317 B1 | 1/2006 | Bishop et al. |
| 7,013,456 B1 | 3/2006 | Van Dyke et al. |
| 7,043,485 B2 | 5/2006 | Manley et al. |
| 7,047,250 B1 * | 5/2006 | Agarwal et al. ................ 1/1 |
| 7,051,053 B2 | 5/2006 | Sinha |
| 7,065,633 B1 | 6/2006 | Yates et al. |
| 7,069,277 B2 | 6/2006 | Okada et al. |
| 7,069,421 B1 | 6/2006 | Yates et al. |
| 7,096,264 B2 | 8/2006 | Bonney et al. |
| 7,111,290 B1 | 9/2006 | Yates et al. |
| 7,113,934 B2 | 9/2006 | Levesque et al. |
| 7,120,631 B1 | 10/2006 | Vahalia et al. |
| 7,165,079 B1 | 1/2007 | Chen et al. |
| 7,194,623 B1 | 3/2007 | Proudler et al. |
| 7,197,520 B1 | 3/2007 | Matthews et al. |
| 7,200,616 B2 | 4/2007 | Takeuchi et al. |
| 7,203,711 B2 | 4/2007 | Borden et al. |
| 7,225,208 B2 | 5/2007 | Midgley et al. |
| 7,225,308 B2 | 5/2007 | Melament et al. |
| 7,237,075 B2 | 6/2007 | Welsh et al. |
| 7,257,606 B2 | 8/2007 | Kapoor et al. |
| 7,305,529 B1 | 12/2007 | Kekre et al. |
| 7,318,093 B2 | 1/2008 | Touboul |
| 7,328,260 B1 | 2/2008 | Muthiyan et al. |
| 7,330,997 B1 | 2/2008 | Odom |
| 7,401,338 B1 | 7/2008 | Bowen et al. |
| 7,409,644 B2 | 8/2008 | Moore et al. |
| 7,487,493 B1 | 2/2009 | Faulkner |
| 7,516,103 B1 | 4/2009 | Peitrucha et al. |
| 7,529,782 B2 | 5/2009 | Prahlad et al. |
| 7,609,829 B2 | 10/2009 | Wang et al. |
| 7,643,998 B2 | 1/2010 | Yuen et al. |
| 7,661,135 B2 | 2/2010 | Byrd et al. |
| 7,664,750 B2 | 2/2010 | Frees et al. |
| 8,032,496 B2 * | 10/2011 | Sinha et al. ................ 707/685 |
| 8,260,753 B2 | 9/2012 | Kushwah et al. |
| 2001/0013087 A1 | 8/2001 | Ronstrom |
| 2001/0047368 A1 | 11/2001 | Oshinsky et al. |
| 2002/0021869 A1 | 2/2002 | Griffin |
| 2002/0032754 A1 | 3/2002 | Logston et al. |
| 2002/0046275 A1 | 4/2002 | Crosbie et al. |
| 2002/0083037 A1 | 6/2002 | Lewis et al. |
| 2002/0083053 A1 | 6/2002 | Richard et al. |
| 2002/0097645 A1 | 7/2002 | Mikawa |
| 2002/0107877 A1 | 8/2002 | Whiting et al. |
| 2002/0145742 A1 | 10/2002 | Koenig et al. |
| 2002/0188590 A1 | 12/2002 | Curran et al. |
| 2003/0018657 A1 | 1/2003 | Monday |
| 2003/0046313 A1 | 3/2003 | Leung et al. |
| 2003/0088536 A1 | 5/2003 | Bahnia |
| 2003/0093709 A1 | 5/2003 | Ogawa et al. |
| 2003/0110275 A1 | 6/2003 | Banerjee et al. |
| 2003/0110419 A1 | 6/2003 | Banerjee et al. |
| 2003/0120818 A1 | 6/2003 | Ho |
| 2003/0131098 A1 | 7/2003 | Huntington et al. |
| 2003/0135703 A1 | 7/2003 | Martin et al. |
| 2003/0140204 A1 | 7/2003 | Ashton et al. |
| 2003/0159007 A1 | 8/2003 | Sawdon et al. |
| 2003/0182301 A1 | 9/2003 | Patterson et al. |
| 2004/0010487 A1 | 1/2004 | Prahlad et al. |
| 2004/0064488 A1 | 4/2004 | Sinha |
| 2004/0078630 A1 | 4/2004 | Niles et al. |
| 2004/0088334 A1 * | 5/2004 | Klein ................ 707/203 |
| 2004/0107199 A1 | 6/2004 | Dalrymple et al. |
| 2004/0133602 A1 | 7/2004 | Kusters et al. |
| 2004/0181691 A1 | 9/2004 | Armingaud et al. |
| 2004/0193621 A1 | 9/2004 | Moore et al. |
| 2004/0199626 A1 | 10/2004 | Nuggehalli |
| 2004/0230737 A1 | 11/2004 | Burton et al. |
| 2004/0246123 A1 | 12/2004 | Kawabe et al. |
| 2004/0261070 A1 | 12/2004 | Miller et al. |
| 2004/0267836 A1 | 12/2004 | Armangau et al. |
| 2005/0021565 A1 | 1/2005 | Kapoor et al. |
| 2005/0021859 A1 | 1/2005 | Willian et al. |
| 2005/0021869 A1 | 1/2005 | Aultman et al. |
| 2005/0027702 A1 | 2/2005 | Jensen et al. |
| 2005/0055328 A1 | 3/2005 | Yagawa |
| 2005/0065986 A1 * | 3/2005 | Bixby et al. ................ 707/204 |
| 2005/0086241 A1 | 4/2005 | Ram et al. |
| 2005/0086342 A1 | 4/2005 | Burt et al. |
| 2005/0114409 A1 * | 5/2005 | Sinha et al. ................ 707/203 |
| 2005/0120242 A1 | 6/2005 | Mayer et al. |
| 2005/0131990 A1 | 6/2005 | Jewell |
| 2005/0166082 A1 | 7/2005 | Williams et al. |
| 2005/0187992 A1 | 8/2005 | Prahlad et al. |
| 2005/0228832 A1 | 10/2005 | Ghotge et al. |
| 2005/0278393 A1 | 12/2005 | Huras et al. |
| 2005/0283567 A1 | 12/2005 | Popescu-Stanesti et al. |
| 2006/0029038 A1 | 2/2006 | Jungck |
| 2006/0031468 A1 | 2/2006 | Atluri et al. |
| 2006/0112151 A1 | 5/2006 | Manley et al. |
| 2006/0149793 A1 | 7/2006 | Kushwah et al. |
| 2006/0225065 A1 | 10/2006 | Chandhok et al. |
| 2006/0282439 A1 | 12/2006 | Allen et al. |
| 2007/0061505 A1 | 3/2007 | Deng et al. |
| 2007/0088923 A1 | 4/2007 | Armstrong-Crews et al. |
| 2007/0136463 A1 | 6/2007 | Guenther et al. |
| 2008/0162595 A1 | 7/2008 | Kushwah et al. |
| 2008/0162685 A1 | 7/2008 | Kushwah et al. |
| 2008/0162719 A1 | 7/2008 | Singh Kushwah et al. |
| 2008/0177805 A1 | 7/2008 | Kushwah et al. |
| 2009/0282047 A1 | 11/2009 | Lin et al. |
| 2010/0299213 A1 | 11/2010 | Yeganeh |
| 2012/0303587 A1 | 11/2012 | Kushwah et al. |

OTHER PUBLICATIONS

Qu et al., Efficient Data Restoration for a Disk-Based Network Backup System, Mechatronics, 2001, ICM '04, Proceedings on the IEEE International Conference, Istanbul Turkey, Jun. 3-5, 2004.

Levy et al., "Incremental Recovery in Main Memory Database Systems", IEEE vol. 4, Dec. 1992, pp. 529-540.

Shrira et al., "SNAP: Efficient snapshots for back-in-time execution", IEEE, Apr. 5-8, 2005, pp. 434-445.

Peter J. Varman & Rakesh M. Verma, An Efficient Multiversion Access Structure, May/Jun. 1997, IEEE Transactions on Knowledge and Data Engineering, vol. 9, No. 3.

(56) References Cited

OTHER PUBLICATIONS

Shira et al., SNAP: Efficient Snapshots for Back-in-Time Execution, Apr. 5-8, 2005, IEEE, 434-445.
U.S. Appl. No. 60/640,971, filed Dec. 31, 2004, Kushwah et al.
U.S. Appl. No. 11/084,179, filed Mar. 18, 2005, Kushwah et al.
U.S. Appl. No. 11/084,065, filed Mar. 18, 2005, Kushwah et al.
U.S. Appl. No. 11/084,679, filed Mar. 18, 2005, Kushwah et al.
U.S. Appl. No. 11/084,066, filed Mar. 18, 2005, Kushwah et al.
U.S. Appl. No. 11/084,067, filed Mar. 18, 2005, Kushwah et al.
Qu et al., "Efficient data restoration for a disk-based network backup system", Mechatronics, 2004. ICM '04. Proceedings of the IEEE International Conference on Istanbul, Turkey, Jun. 3-5, 2004.
Author Unknown, FAST Data Search™ Product Line, Version 4.0.
Author Unknown, FAST Data Search, the Enterprise Search Solution, http://www.fastsearch.com/us/products/fast_data_search.
Google, Google Enterprise Solutions, Google search for your business, http://www.google.com/enterprise/.
Google, Google Enterprise Solutions: Google Search Appliance.
Varman et al., "An Efficient Multiversion Access Structure", 1997, IEEE, vol. 9, 391-409.

* cited by examiner

DATA OBJECT SEARCH AND RETRIEVAL

BACKGROUND OF THE INVENTION

Data objects and other stored data, such as files in a file system, can be modified and over-written many times during the course of data production and use. Since a backup application or system can capture a state of a set of data, e.g., a file, as it exists at the time an associated backup operation is performed, backup data can be used to obtain a previous version of data, such as a file, captured during a previous backup operation. Obtaining a version of a file or other data from associated backup data typically involves determining the appropriate backup source (e.g., a specific backup tape containing the desired file version), using the backup source to restore an associated data set (e.g., a set of production data as it existed at a time at which a backup operation associated with the backup source was performed), and searching or browsing to determine if the desired file version is present in the restored data set.

If the specific location of a desired version of a file is not known, finding the desired version can be difficult. In some cases, it may be necessary to search multiple individual backup sources to locate a desired version. For example, when searching for all versions of files containing a specific keyword, in addition to searching the production storage, e.g., using a production search utility (e.g., Microsoft Windows Explorer), all applicable removable backup media, backup hard drives, and networked storage units containing backup data might have to be individually restored and searched as described above. Once the desired files are located, the relationship between the files typically would have to be determined separately and it might be necessary to use one or more other applications and/or utilities to obtain the desired version(s) from the applicable data source(s). Therefore, there exists a need to efficiently locate one or more desired versions of a data object or other related data in a universe of data that may include one or more sets of backup data.

BRIEF DESCRIPTION OF THE DRAWINGS

Various embodiments of the invention are disclosed in the following detailed description and the accompanying drawings.

DETAILED DESCRIPTION

Figure 1:
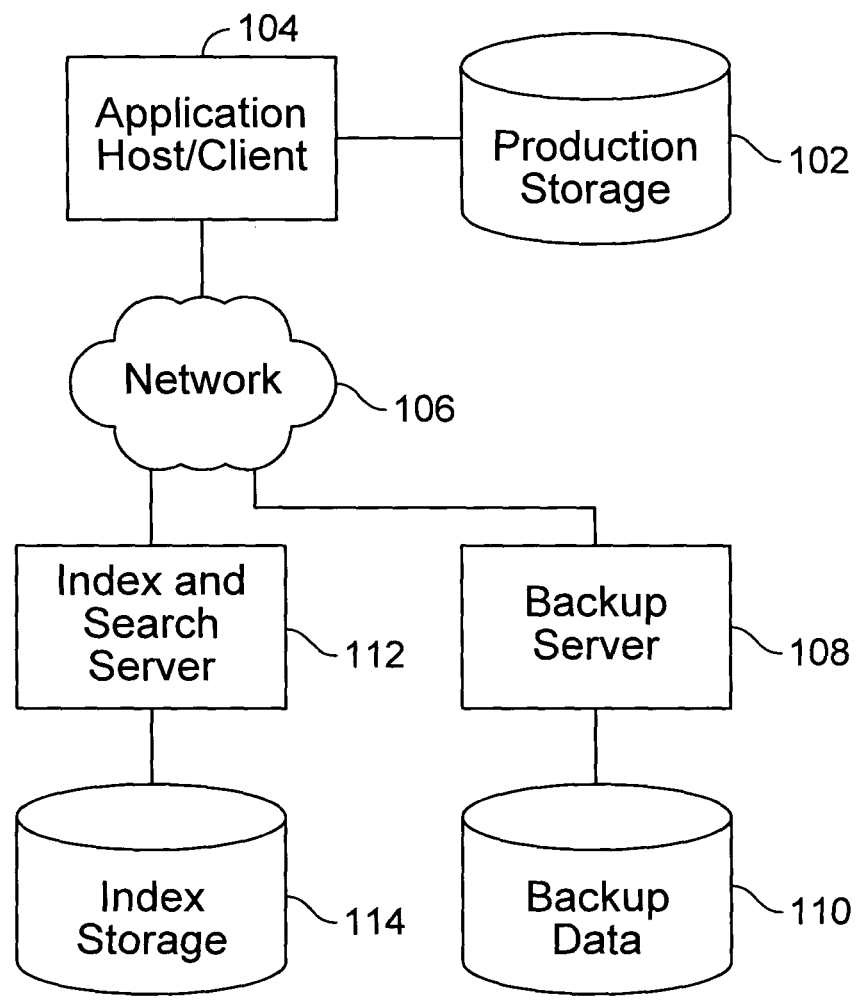
FIG. 1 is a block diagram illustrating an embodiment of a data object search enabled environment.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Searching backup data for versions of related data, such as files or other data objects, is disclosed. As used herein, the term "data object" refers to any identifiable set of related data that is generated, accessed, retrieved, modified, or otherwise processed by an application or other process or system as an identifiable set of related data, including without limitation a file or other data object stored in a file system. In some embodiments, two data objects are considered to be related if one data object is a subsequent version of the other data object. One data object may be copied, modified, replaced, and/or derived from the other data object. For example, a first data object is related to a second data object if the first data object has ever shared a common file name and/or path or another identifier with the second data object or another data object related to the second data object. In some embodiments, backup data may include one or more data objects backed up from production data, each of which data objects is stored in the backup data in the form in which it existed in the production data at the time the associated backup operation was performed. If the data object was subsequently (or previously) changed or deleted, the data object as stored in the backup data may comprise a prior (or subsequent) version of a corresponding data object existing elsewhere, e.g., a current version residing in an associated set of production data, a subsequent version included in a subsequently-generated set of backup data, or a prior version included in a previously-generated set of backup data.

In some embodiments, backup data is indexed for efficient searching. In some embodiments, production data is indexed for efficient searching. In some embodiments, indexing includes generating data that can be used to determine whether a data of interest is present in a set of backup or production data and/or where the data of interest is located within a set of backup or production data. In some embodiments, indexing includes associating versions of related and/or or same files or data together. In some embodiments, indexes for multiple sets of backup and production data are integrated and/or stored together with location identifiers indicating for each file or other object the location of associated data within the backup or production data (e.g., identifying the associated data set and a location of the object within that set). In some embodiments, the indexes are searched to locate a desired file or other object. In some embodiments in the event a first data object that is responsive to the search comprises a version of one or more other data objects that are responsive to the search, the search result includes data indicating that the first data object comprises a version of one or more other data objects responsive to the search. In some embodiments, search results are organized into groupings, a grouping including search results associated with versions of related and/or same files or data. A search in which multiple version of a data object are identified, located, and/or presented in response to a query is sometimes referred to herein as a "generational" search, in the sense that multiple "generations" or versions over time of the same data object, if present in the searched data, are included in the search result. In some embodiments, search results include a location identifier for each instance or occurrence of an object found in the index. Using the identifier(s), the desired data may be located within the backup or production data and retrieved.

FIG. 1 is a block diagram illustrating an embodiment of a data object search enabled environment. Production storage 102 is connected to application host/client 104. Backup data 110 is connected to backup server 108. Index storage 114 is connected to index and search server 112. Application host/client 104, backup server 108, and index and search server 112 are connected together through network 106. Any number of production storage 102, application host/client 104, backup server 108, backup data 110, index and search server 112, and index storage 114 may exist. Production storage 102, backup data 110, and index storage 114 may be one or more storage mediums, including hard drives, file system partitions, backup tapes, NAS (Network Attached Storage), SAN (Storage Area Network), any optical and magnetic storage medium, and any fixed, removable, or networked storages. Any of the connections shown in FIG. 1 may comprise one or more direct and/or network or other connections, and the elements shown in FIG. 1 may be connected via an arrangement other than as shown in FIG. 1, e.g., each element may be connected to and accessible to each other via network 106.

In various alternative embodiments, backup data 110 is connected via network 106 to backup server 108 and/or to application host/client 104; is included in and/or connected locally, e.g., via a direct or storage area network connection, to application host/client 104; and/or is included in or connected to a storage node or proxy client associated with backup server 110 and/or application host/client 104. In some embodiments, backup data 110 contains data associated with one or more backup operations performed by or under the control or supervision of backup server 108, such as data indicating for each of one or more objects comprising a set of backup data a location of the object within the set of backup data.

In some embodiments, backup data 110 includes one or more data objects backed up from production storage 102. If a data object as included in backup data 110 has subsequently been modified, the data object as included in backup data 110 may comprise a version of the data object as it subsequently exists on production storage 102 or in a subsequently backed up version included in backup data 110 and/or other backup data associated with production storage 102. The backup data 110 may in some embodiments contain multiple versions of the same data object, e.g., if the backup data 110 comprises backup data generated by two or more backup operations performed at different points in time with respect to the same set (or overlapping sets) of production data. The data objects may be backed up on a periodic interval, a prescribed instance, or a configured time. The periodic interval, the prescribed instance, and the configured time may be preconfigured or dynamically configured. In some embodiments, backup is performed after at least one data change is made to the production storage. In some embodiments on each backup, only data changes from the last completed backup is backed up. In some embodiments, at least a configured portion of the production storage is backed up on each backup instance. In some embodiments, backup data includes one or more of the following: snapshot data, compressed backup data, generational backup data, continuously mirrored and/or backed up data, and backup data in removable storage formats. One or more backup instances may be combined with another backup instance or deleted after a configured amount of time has passed since the creation of the backup instance.

In the example shown, application host/client 104 hosts an application and stores associated application data in production storage 102. In some embodiments, application host/client 104 is configured to perform at least in part a backup operation in which application data stored in production storage 102 is backed up. In some embodiments, an agent installed on application host/client 104 performs or participates in performing a backup of application data stored in production storage 102. In some embodiments, application host/client 104 facilitates indexing and/or searching of data in production storage 102. Index and search server 112 may communicate with application host/client 104 for indexing and/or searching production storage 102. Production storage 102 may be a hard drive associated with a personal computer. Application host/client 104 may include a processor associated with a personal computer. Application host/client 104 and production storage 102 may comprise a personal computer.

Backup server 108 facilitates communication between backup data 110 and devices connected to network 106. Backup server 108 may perform processing such as backup coordination and compression. In some embodiments, backup server 108 is a server running EMC Legato NetWorker backup and recovery software available from EMC Corporation of Hopkinton, Mass. In some embodiments, backup server 108 comprises and/or is connected directly or via network 106 to one or more storage nodes that include multiplexing/demultiplexing backup stream capability and/or Universal Proxy Clients that perform various backup processing such as offloading from an application server such as application host/client 104 such tasks as backup, data movement, etc. Index storage 114 stores search data (e.g., index data) associated with backup data 110 and/or production storage 102. Index and search server 112 may create, maintain, search, transfer, and process data associated with index storage 114. Network 106 may be any public or private network and/or combination thereof, including without limitation an Ethernet, serial/parallel bus, intranet, Internet, NAS, SAN, LAN, WAN, and other forms of connecting multiple systems and or groups of systems together. In some embodiments, production storage 102, backup data 110, and/or index storage 114 are connected to network 106 through other data routing paths and/or connected to one or more other systems.

In some embodiments, a search/retrieve application, agent, or interface running on application host/client 104 or some other host sends a search query to index and search server 112. Server 112 searches, based on the received query, an index stored in index storage 114 and returns search results that include for each of one or more data objects that satisfy the query a location identifier indicating a corresponding location of the object within a set of backup data or production data associated with the index. In some embodiments in the event a first data object that is responsive to the search comprises a version of one or more other data objects that are responsive to the search, the search result includes data indicating that the first data object comprises a version of one or more other data objects responsive to the search. In some embodiments, the search result is organized at least in part by related versions of data objects. In some embodiments, a link, button, or other interface is provided to enable one or more objects identified in the search results to be retrieved. In some embodiments responsive objects are retrieved automatically, without further request or indication. The search/retrieve application sends to the backup server or the production storage the location identifier(s) of data to be retrieved. In some embodiments if the location identifier(s) is sent to the backup server, the backup server retrieves the data from backup data 110 using the location identifier(s) and sends the retrieved data to the search/restore application. The retrieved data may be available to be viewed, accessed, and/or used by an application running on application host/client 104. In some embodiments, the retrieved data is saved as new data in production storage 102 or used to replace/merge pre-existing data in production storage 102. In some embodiment if the location identifier(s) is sent to the backup server or production storage, the backup server or the production storage verifies that the location identifier(s) matches a data in the production storage and retrieves the data.

Figure 2:
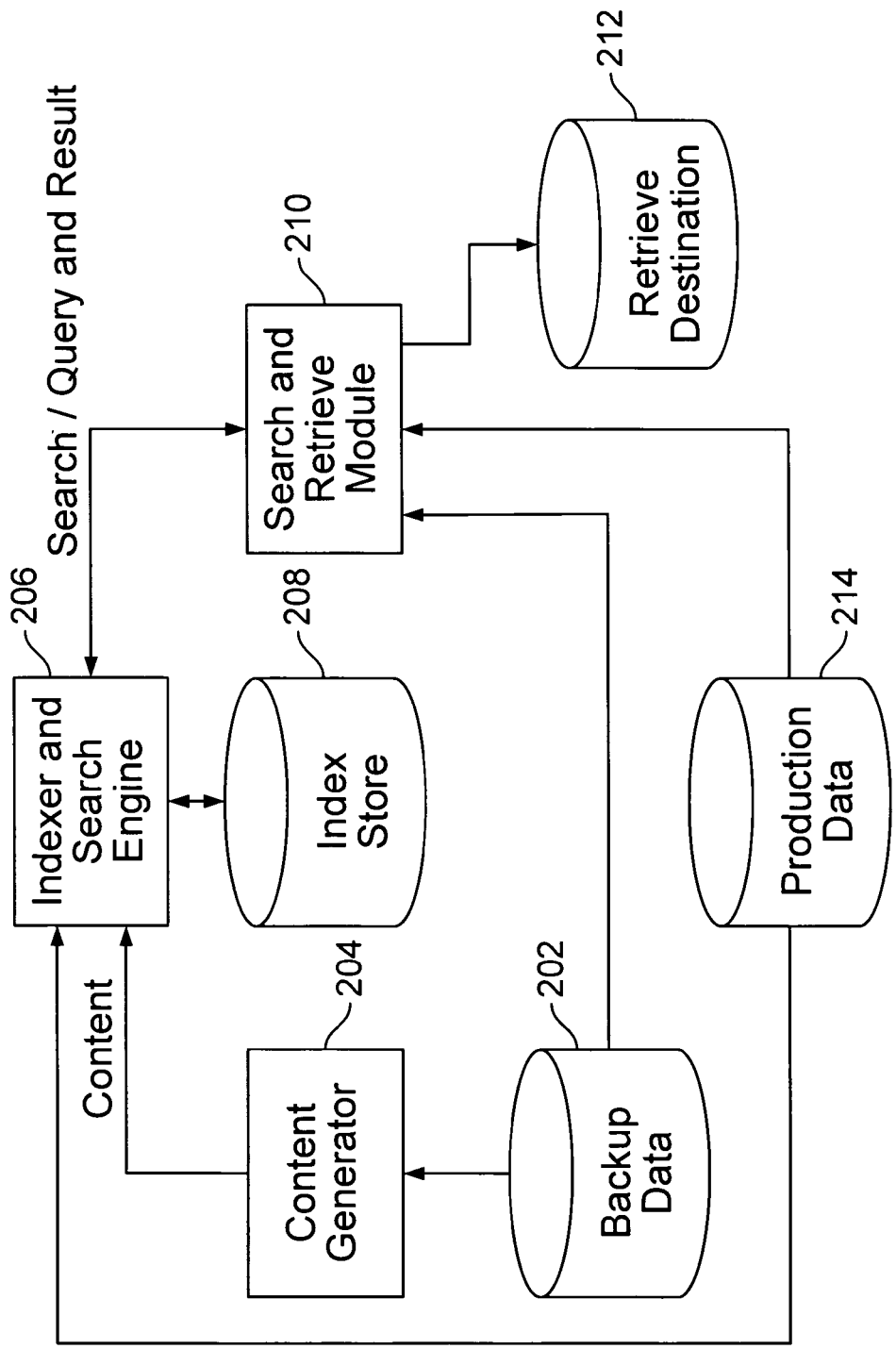
FIG. 2 is a block diagram illustrating the flow of data in an embodiment of a data object version search enabled environment.

FIG. 2 is a block diagram illustrating the flow of data in an embodiment of a data object version search enabled environment. In the example shown, backup data 202 and production data 214 may include a data stream generated by an application and/or data stored on one or more of the following: hard drives, backup tapes, NAS (Network Attached Storage), SAN (Storage Area Network), any optical and magnetic storage medium, and any fixed, removable, or networked storages. Backup data 202 may include one or more types of backup data containing one or more versions of a data object including backup-to-disk, backup-to-tape, snapshot, generational backup, and/or backup stream. Production data 214 may include at least one latest or currently being modified version of a data object previously backed up in backup data 202. Content generator 204 processes data comprising and/or associated with backup data 202 for indexing by indexer and search engine 206. Content generator 204 may decompress, convert, translate, and/or transfer data comprising and/or associated with backup data 202 into a format associated with indexer and search engine 206. Content generator 204 may process data from backup data 202 on a prescribed basis, periodically, and/or substantially concurrent with storage of data in backup data 202 or production data 214 and/or generation of backup data 202 or production data 214 by an associated process. Indexer and search engine 206 may index production data 214. In some embodiments, a content generator process production data 214 for indexing by indexer and search engine 206.

For example on a first configured periodic interval, production data 214 is indexed by indexer and search engine 206. As new backups are performed on a second periodic interval longer than the first periodic interval, the new backup data may be passed to content generator 204 as well as a backup data storage unit. Indexer and search engine 206 receives content from content generator 204 and production data 214 and indexes and prepares the data for searching. As newer generational data is indexed, indexes associated with associated older generations and indexed production data are updated/modified/deleted accordingly. Indexing includes any method for processing data for search and retrieval. In some embodiments, indexing includes associating related versions of data objects together. Indexing and searching software such as FAST InStream available from FAST of Needham, Mass. may be used. In some embodiments, a searchable index data associated with the indexing and searching is generated and stored in index store 208. In some embodiments, the searchable index data includes integrated index data from multiple data sources, backup types, and/or backup instances. In some embodiments, the index data is divided into groupings. The groupings may be associated with different data sources, backup types, and/or backup instances. In some embodiments, data in index store 208 includes location identifiers associated with backup data 202 or production data 214 that indicate locations of associated data, e.g., one or more particular data object versions, such as a file, directory, or other file system object versions in backup data 202 or production data 214. For example, a data entry in index store 208 might include keywords and a unique identifier associated a file or other object in backup data 202 or production data 214. Using the generated index data, indexer and search engine accepts search queries from search and retrieve module 210. In some embodiments, a data entry in index store 208 includes identifiers and/or pointers to one or more other data entries associated with other versions of related data objects.

In some embodiments, a search associated with a query is performed by engine 206, using index data stored in index store 208, and the results of the query are returned to module 210 along with location identifiers associated with responsive portion(s) of backup data 202 or production data 214. In some embodiments, the search results that correspond to related versions of a data object are organized together. Search and retrieve module 210 in some embodiments coordinates and/or facilitates interaction between engine 206, backup data 202, production data 214, and retrieve destination 212. Using the received identifiers in the search result, module 210 communicates to backup data 202 and/or production data 214 one or more identifiers associated with the desired data to be retrieved. Backup data 202 and/or production data 214 retrieves the data associated with the identifiers and returns the desired data to module 210 for data retrieval into destination 212. The data may be decompressed, converted, modified, and/or merged before retrieval into destination 212. In some embodiments, index store 208 and/or production data 214 and/or backup data 202 exists in a same physical storage unit. In some embodiments, retrieve destination contains production data 214 and/or backup data 202.

Figure 3A:
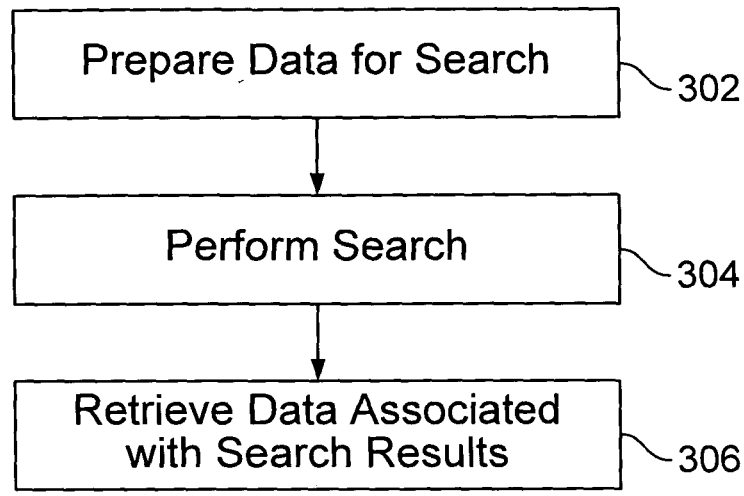
FIG. 3A is a flow chart illustrating an embodiment of a process for searching and retrieving data object versions.

FIG. 3A is a flow chart illustrating an embodiment of a process for searching and retrieving data object versions. At 302, data associated with backup data is prepared for searching. In some embodiments data associated with backup and production data is prepared for searching. Preparing might include indexing, converting, decompressing, translating, and/or transferring data. Preparing backup data for searching may be performed on a prescribed basis, periodically, and/or substantially concurrent with generation of new production data and/or backup data, e.g., in connection with a production data save operation or backup operation. At 304, a search is performed using data associated with the data search preparation, such as an index. Once data desired to be retrieved has been located through searching, at 306 data associated with one or more search results are retrieved from the production data and/or backup data.

Figure 3B:
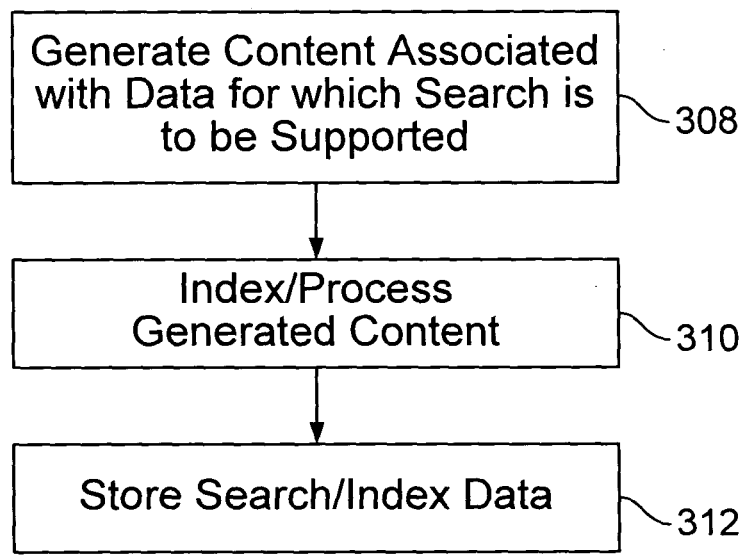
FIG. 3B is a flow chart illustrating an embodiment of a process for preparing data for searching.

FIG. 3B is a flow chart illustrating an embodiment of a process for preparing data for searching. In some embodiments, the process of FIG. 3B is included in 302 of FIG. 3A. At 308, content associated with data for which a generational search and/or retrieval functionality is to be made available is generated. In some embodiments, content associated with one or more sets of backup data and optionally also production data is generated at 308. The content generation may include decompressing, converting, translating, and/or transferring at least a portion of backup/production data for preparing the data for search processing. At 310, the generated content is processed for searching. In some embodiments, processing for search includes generating a searchable index of the data. In some embodiments, the searchable index includes data that can be used to determine whether a data object of interest is present in a set of backup/production data and/or where data of interest is located within a set of backup/production data. In some embodiments, the searchable index is used to determine where a particular data object of interest is located in a set of backup/production data without accessing or searching the actual backup/production data. In some embodiments, the searchable index is used to determine related versions of data objects. The searchable index may be organized in an order associated with related data object versions or may contain identifiers or pointers associated with related data object versions. Related versions of data objects may be identified using one or more of the following: file name, file path, file attribute, file size, file contents, file creation time, file modification time, inode number, backup information, and associated location identifier. In some embodiments, index data is not organized in an order associated with related data object versions and does not contain identifiers or pointers associated with related data object versions. In some embodiments, data object relationships are determined when a query is performed.

Keywords may be generated using the content and associated with identifiers indicating the location of specific data within the backup/production data. The location identifier may include a file path within the backup/production data; a location of a file or other object on backup/production media; a media path, volume or location; or any other location data that could later be used to retrieve the associated data and/or object. In some embodiments, the location identifier may be independent of any physical and logical data location and independent of type of backup/production data. For example, the identifier may be a unique identification number such as a uniform resource identifier (URI). The identification number corresponding to the associated data is valid even if the associated data is relocated to another physical or logical location or even if the data is converted, translated, or compressed. Processing the backup/production data for searching may include any processing preparation required for any search methodology. Index and keyword search methodology is merely an illustrative example.

In some embodiments, the indexes may not be valid after a data is converted, translated, or compressed. Since the production data may change in between periodic indexing of the production data, a location identifier associated with an index may identify an incorrect location of a data object if the data object has been modified or moved since the creation of the index and the identifier. In some embodiments, the indexes are modified when a change is made to the backup or production data. In some embodiments, location identifiers are verified before being used to retrieve data. At 312, at least a portion of data generated in 310 is stored. The data stored in 312 may be stored together with the backup/production data or in a separate logical or physical storage unit. In some embodiments, the data stored in 312 is not stored in a storage unit. It may be stored temporarily in memory or generated every time a search is performed.

Figure 3C:
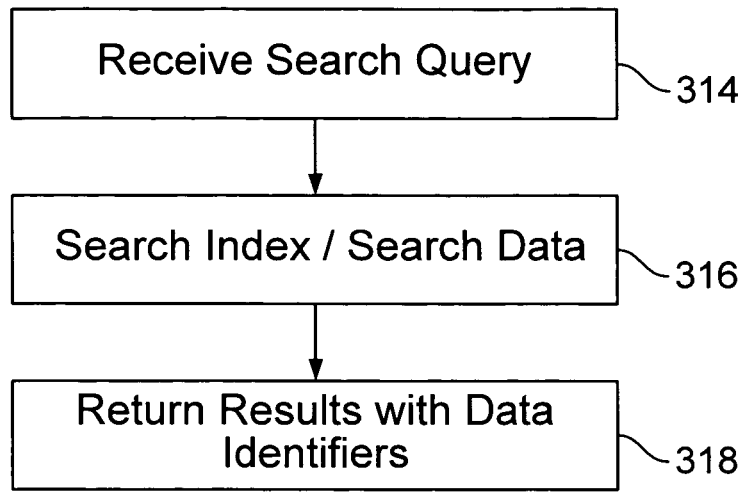
FIG. 3C is a flow chart illustrating an embodiment of a process for performing a data object version search.

FIG. 3C is a flow chart illustrating an embodiment of a process for performing a data object version search. In some embodiments, the process of FIG. 3C is included in 304 for FIG. 3A. In some embodiments, FIG. 3C may be implemented in indexer and search engine 206 of FIG. 2. At 314, a search query is received. The search query may be sent from a data search application. The search application may be a part of a backup recovery application. In some embodiments, security authentication is required before a search query is accepted. At 316, a search associated with the query is performed. Performing the search may include searching index data associated with the backup/production data. A search engine such as the FAST Instream may be used. At 318, the results of the search query are returned with one or more identifiers indicating the locations of specific data within the backup data or production data. Returning the query result may include compiling multiple intermediate search results together. In some embodiments in the event a data object that is responsive to the search query comprises a version of one or more other data objects that are responsive to the search query, the results of the search query include data indicating the version relationship between the data object responsive to the search query. In some embodiments, data object versions related to a search responsive data object version, yet not directly responsive to the search query, is included in the search result. For example, all versions of a data object may be included in a search result even though only one versions of the data object is directly responsive to the search query. The version relationship may be determined using one or more of the following: file name, file path, file attribute, file size, file contents, file creation time, file modification time, inode number, backup information, and associated location identifier. In some embodiments, the search results are returned to a search and retrieve application.

Figure 3D:
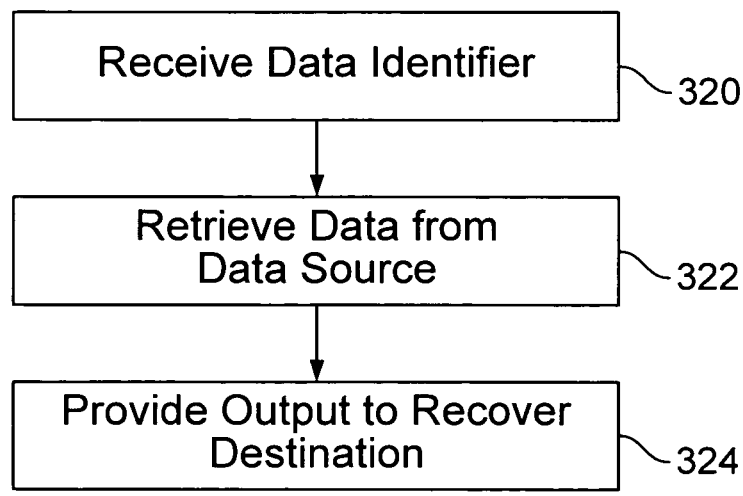
FIG. 3D is a flow chart illustrating an embodiment of a process for retrieving data with a data identifier.

FIG. 3D is a flow chart illustrating an embodiment of a process for retrieving data with a data identifier. In some embodiments, the process of FIG. 3D is included in 306 of FIG. 3A. At 320, a location identifier associated with a data to be retrieved is received. One or more identifiers may be received. An identifier may be associated with one or files and/or directories associated with the backup data or production data. At 322, the data is retrieved from a data source. The data source includes any physical or logical data storage unit, including hard drives, file system partitions, backup tapes, NAS (Network Attached Storage), SAN (Storage Area Network), any optical and magnetic storage medium, and any fixed, removable, or networked storages. Retrieving the data may include translating the identifier to a location within the backup data or production, locating and retrieving the data source, and locating and retrieving the desired data within the data source. If the indexes are not updated every time a change is made to the backup and/or production data, the identifier may be verified before used to retrieve data. At 324, an output data is provided to the recover destination. The output data may be the retrieved data or the retrieved data may be decompressed, modified, converted, translated, merged, or used to replace other data before being provided as the output data. In some embodiments, the output data is provided to an intermediate module before being provided to the retrieval destination.

Figure 4:
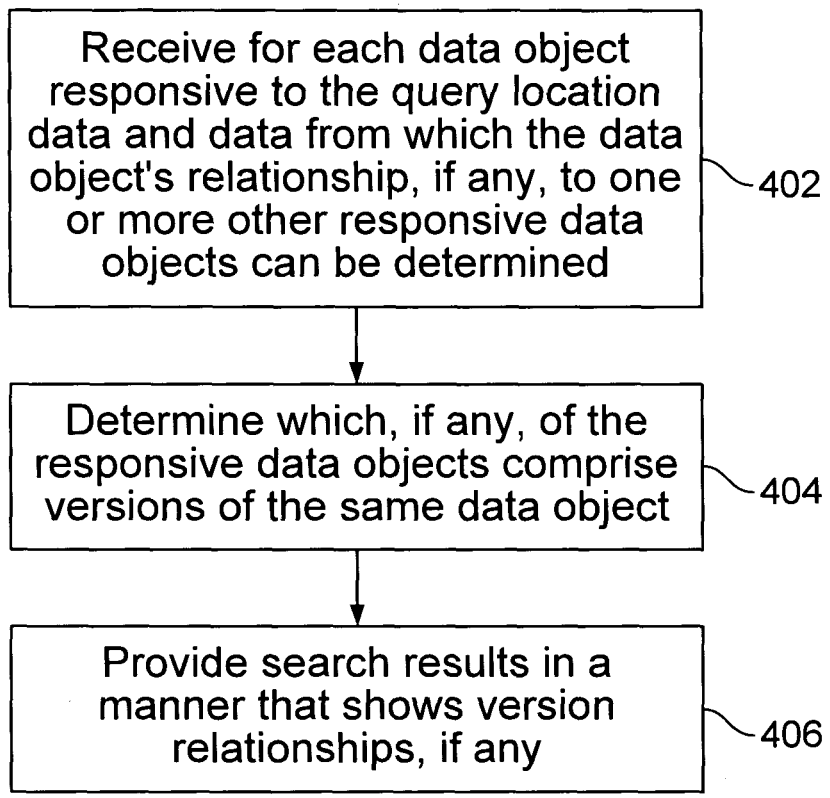
FIG. 4 is a flow chart illustrating an embodiment of a process for returning search results.

FIG. 4 is a flow chart illustrating an embodiment of a process for returning search results. In some embodiments, 318 of FIG. 3C includes the process of FIG. 4. At 402, location data and data from which a responsive data object's relationship, if any, to one or more other responsive data objects can be determined are received for each data object that is identified as being responsive to a query, e.g., in 316 of FIG. 3C. In some embodiments, the data from which a responsive data object's relationship, if any, to one or more other responsive data objects can be determined includes an identifier associated with the data object, such as a file name or path. In 404, it is determined which, if any, of the responsive data objects comprise versions of the same data object. In some embodiments, data objects having the same file name and/or path but different timestamps (or other data indicating a time the data object was last saved or otherwise stored, e.g., in connection with a backup operation) are determined in 404 to be versions of the same data object. In 406, search results are provided in a manner that shows the version relationships, if any, between responsive data objects.

Figure 5:
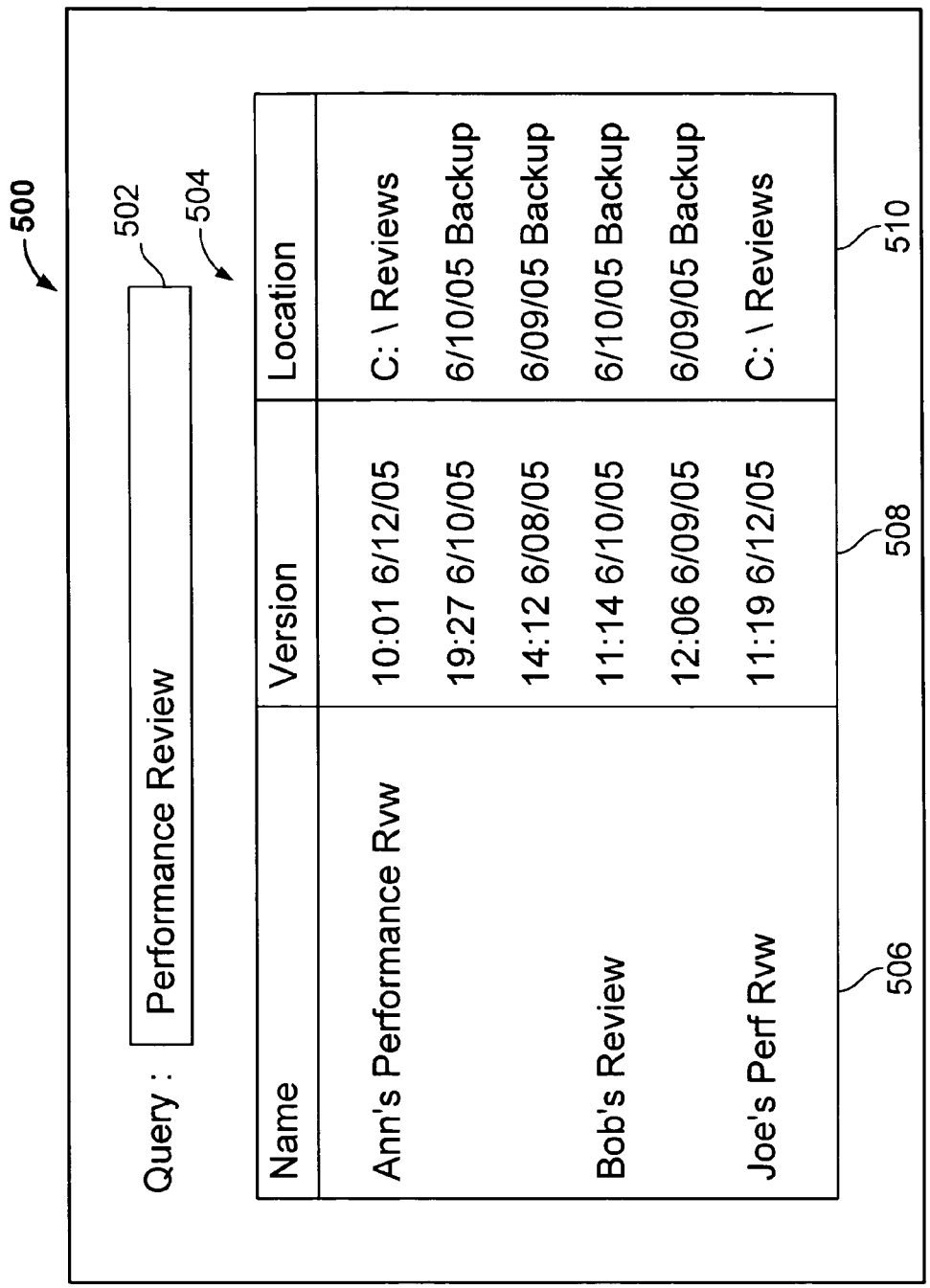
FIG. 5 illustrates an embodiment of a data object search results display in which the relationship between responsive data objects is shown.

FIG. 5 illustrates an embodiment of a data object search results display in which the relationship between responsive data objects is shown. The display 500 includes a query text box 502 in which one or more query terms are displayed. In the example shown, a user has previously submitted a query including the terms "performance" and "review". The display 500 includes a search results display area 504 in which, in the example shown, data objects—in this case files—identified as being responsive to the query shown in query box 502 are displayed. In the example shown, three versions of a data object entitled "Ann's Performance Rvw", two versions of a data object entitled "Bob's Review", and one instance of a data object entitled "Joe's Perf Rvw". The name of each responsive data object is displayed in a "name" display area 506 of search results display area 504. The time and date (e.g., time/date last saved) of each located version of each responsive data object is shown in a "version" display area 508, and the location of each version is shown in a "location" display area 510. In various embodiments, the version and/or location information may comprise a selectable link or other control which, upon being selected by a user of the display 500, would cause the associated version of the associated data object to be retrieved. In the example shown in FIG. 5, responsive data objects are listed alphabetically by object name and as between data objects have the same name they are listed in order based on version time/date, with the most recent version being listed first and any remaining versions being listed in descending order by time/date. In the example shown, a most recent version of "Ann's Performance Rvw" and "Joe's Perf Rvw" are shown as residing in production data in a folder named "reviews" on the local "c" drive, e.g., a local hard drive. In the example shown, no version of "Bob's Review" was found in the production data. Such a scenario may occur where, e.g., the data object "Bob's Review" was inadvertently deleted from the "c" drive and/or a version on the "c" drive became irrecoverably corrupted. In some embodiments, a user seeking to recover the most recent version of the data object "Bob's Review" that is currently available would select a link or control associated with the "11:14 6/10/05" version found to exist in the "6/10/05 Backup" data—e.g., a set of backup data generated and stored in connection with a daily or nightly backup operation performed on 6/10/05—which would result in the selected version being retrieved, e.g., by invoking an associated backup and recovery application. Similarly, a user of display 500 could in some embodiments retrieve a prior version of a data object, such as a prior version of "Ann's Performance Rvw", e.g., to revert to an earlier version of the data object if subsequent revisions to the data object were found to be undesired, e.g., upon review by a senior manager. In some embodiments, if the same version, e.g., as identified by timestamp, of a data object is found to reside in more than one location, only the instance residing at the most readily accessible location, in the case of backups typically but not necessarily the most recent backup, is displayed. In the example shown, the "14:12 6/08/05" version of "Ann's Performance Rvw" may exist in both a "6/08/05 Backup" and the "6/09/05 Backup" but only the latter instance is shown.

While in the example shown in FIG. 5 the responsive data objects are files, in this case word processing documents, the techniques described herein may be applied to any type of data object and across data objects of different types. Also, while the data sources (locations) shown in FIG. 5 include production data ("c" drive) and backup data locations, more, fewer, other, and/or different locations may be included in the universe of data searched for data objects responsive to a query. Likewise, while in the example shown in FIG. 5 data objects are determined to be related to each other by virtue of their having the same name, other and/or additional information may be used in some embodiments to determine which data objects are related to one another.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of searching data, comprising:
using a searchable index to determine which, if any, data objects from current production data and a set of backup data are responsive to a search query, wherein a data object in the set of backup data corresponds to a version of the production data as the production data existed when a backup operation was performed;
in the event that a plurality of data objects is responsive to the search query:
determining from the plurality of data objects responsive to the search query a subset of related data objects that are related to each other;
determining from the subset of related data objects a first data object that comprises a version of one or more other data objects included in the subset of related data objects; and
generating for the search query a search result that includes data that indicates version relationships between the first data object and the one or more other data objects included in the subset of related data objects;
in the event no data object is responsive to the search query, generating said search result to indicate that no data object is responsive to the search query; and
presenting, via a display at an interface device, the search result.

2. The method as recited in claim 1, further comprising receiving the search query.

3. The method as recited in claim 1, wherein determining from the plurality of data objects responsive to the search query the subset of related data objects comprises determining if the first data object comprises a subsequent version of one or more other data objects of the plurality of data objects.

4. The method as recited in claim 3, wherein the determination from the plurality of data objects responsive to the search query the subset of related data objects is made using one or more of the following: a file name, a file path, a file attribute, a file size, file contents, a file creation time, a file modification time, an inode number, a backup information, and an associated location identifier.

5. The method as recited in claim 1, wherein the set of backup data includes one or more of the following: versions of data objects backed up from a production data, data objects backed up on a periodic interval, data objects backed up on a prescribed instance, data objects backed up on a configured time, data objects backed up after at least one data change is made to a production storage, incremental backup data, differential backup data, or other backup data comprising data changes from a last completed full backup operation.

6. The method as recited in claim 1, further comprising generating the searchable index, including by performing one or more of the following: decompressing backup data, converting backup data, translating backup data, transferring backup data, indexing backup data, generating keywords associated with backup data, and any processing required for data search and retrieval, on a prescribed basis, periodically, or substantially concurrent with addition, modification, and deletion of the backup data.

7. The method as recited in claim 1, wherein the searchable index includes an index data indicating a location within the set of backup data of a data object comprising the set of backup data and/or index data from multiple data sources, backup types, or backup instances.

8. The method as recited in claim 1, wherein the first data object and a second data object are determined to be related to each other if at least a portion of the first data object is copied, modified, replaced, or derived from the second data object or another data object related to the second data object.

9. The method as recited in claim 1, further comprising using the searchable index to determine which, if any, data objects comprising a set of production data associated with the set of backup data are responsive to the search query.

10. The method as recited in claim 9, further comprising updating the searchable index on a first periodic interval with respect to the set of backup data and updating the searchable index with respect to the set of production data on a second periodic interval.

11. The method as recited in claim 1, wherein the searchable index includes:
   index data associated with data objects associated with one or more of the following: backup data stored in one or more media volumes or other storage locations, backup data generated by one or more backup operations, and production data, and
   location identifiers indicating for each data object a corresponding location of associated data within the backup or production data.

12. The method as recited in claim 1, wherein the search result is organized in an order indicating that the first data object comprises the version of the one or more other data objects included in the subset of related data objects.

13. The method as recited in claim 1, wherein the search result includes data grouped into a group associated with versions of a related data object.

14. The method as recited in claim 1, wherein the search result includes data associated with a non-responsive data object version related to a search responsive data object version, wherein the non-responsive data object version is not directly responsive to the search query.

15. The method as recited in claim 1, further comprising retrieving a data object associated with the search result, wherein the data object may be viewed, accessed, or used by an application, saved as new data in a production storage, or used to replace or merged with a pre-existing data in the production storage.

16. A system for searching data, comprising:
   a processor configured to:
      use a searchable index to determine which, if any, data objects from current production data and a set of backup data are responsive to a search query, wherein a data object in the set of backup data corresponds to a version of the production data as the production data existed when a backup operation was performed;
      in the event that a plurality of data objects is responsive to the search query:
         determine from the plurality of data objects responsive to the search query a subset of related data objects that are related to each other;
         determine from the subset of related data objects a first data object that comprises a version of one or more other data objects included in the subset of related data objects; and
         generate for the search query a search result that includes data that indicates version relationships between the first data object and the one or more other data objects included in the subset of related data objects; and
      in the event no data object is responsive to the search query, generate said search result to indicate that no data object is responsive to the search query;
   an interface device configured to present the search result; and
   a memory coupled to the processor and configured to provide the searchable index.

17. The system as recited in claim 16, wherein determining from the plurality of data objects responsive to the search query the subset of related data objects comprises determining if the first data object comprises a subsequent version of one or more other data objects of the plurality of data objects.

18. The system as recited in claim 17, wherein the determination from the plurality of data objects responsive to the search query the subset of related objects is made using one or more of the following: a file name, a file path, a file attribute, a file size, file contents, a file creation time, a file modification time, an inode number, a backup information, and an associated location identifier.

19. The system as recited in claim 16, wherein the set of backup data includes incremental, differential, or other backup data comprising data changes from a last completed full backup operation.

20. The system as recited in claim 16, the processor further configured to generate the searchable index, including by performing one or more of the following: decompressing backup data, converting backup data, translating backup data, transferring backup data, indexing backup data, generating keywords associated with backup data, and any processing required for data search and retrieval, on a prescribed basis, periodically, or substantially concurrent with addition, modification, and deletion of the backup data.

21. The system as recited in claim 16, wherein the searchable index includes an index data indicating a location within the set of backup data of a data object comprising the set of backup data and/or index data from multiple data sources, backup types, or backup instances.

22. The system as recited in claim 16, wherein the first data object and a second data object are determined to be related to each other if at least a portion of the first data object is copied, modified, replaced, or derived from the second data object or another data object related to the second data object.

23. The system as recited in claim 16, wherein the searchable index includes:
   index data associated with data objects associated with one or more of the following: backup data stored in one or more media volumes or other storage locations, backup data generated by one or more backup operations, and production data, and location identifiers indicating for each data object a corresponding location of associated data within the backup or production data.

24. The system as recited in claim 16, wherein the search result is organized in an order indicating that the first data object comprises the version of the one or more other data objects included in the subset of related data objects.

25. The system as recited in claim 16, wherein the search result includes data associated with a non-responsive data object version related to a search responsive data object version, wherein the non-responsive data object version is not directly responsive to the search query.

26. The system as recited in claim 16, the processor further configured to retrieve a data object associated with the search result, wherein the data object may be viewed, accessed, or used by an application, saved as new data in a production storage, or used to replace or merged with a pre-existing data in the production storage.

27. A computer program product for searching data, the computer program product being embodied in a non-transitory computer readable storage medium and comprising computer instructions for:
    using a searchable index to determine which, if any, data objects from current production data and a set of backup data are responsive to a search query, wherein a data object in the set of backup data corresponds to a version of the production data as the production data existed when a backup operation was performed;
    in the event that a plurality of data objects is responsive to the search query:
        determining from the plurality of data objects responsive to the search query a subset of related data objects that are related to each other;
        determining from the subset of related data objects a first data object that comprises a version of one or more other data objects included in the subset of related data objects; and
        generating for the search query a search result that includes data that indicates version relationships between the first data object and the one or more other data objects included in the subset of related data objects;
    in the event no data object is responsive to the search query, generating said search result to indicate that no data object is responsive to the search query; and
    presenting, via a display at an interface device, the search result.

28. The method as recited in claim 1 further comprising:
    displaying a display element associated with retrieving the first data object; and
    retrieving the first data object after the display element is displayed, wherein retrieving is triggered by interaction with the display element.

29. The method as recited in claim 28, wherein the display element includes a link.

30. The method as recited in claim 28 further comprising displaying, for each of the one or more other data objects, a display element associated with retrieving a corresponding one of said one or more other data objects included in the subset of related data objects.

31. The system as recited in claim 16, wherein:
    the interface device is further configured to display a display element associated with retrieving the first data object; and
    the processor is further configured to retrieve the first data object after the display element is displayed, wherein retrieving is triggered by interaction with the display element.

32. The computer program product as recited in claim 27 further comprising computer instructions for:
    displaying a display element associated with retrieving the first data object; and
    retrieving the first data object after the display element is displayed, wherein retrieving is triggered by interaction with the display element.

33. The method as recited in claim 1 further comprising determining where a data object of interest that is responsive to the search query is located in the set of backup data using the searchable index and without accessing the set of backup data.

34. The system as recited in claim 16, wherein the processor is further configured to determine where a data object of interest that is responsive to the search query is located in the set of backup data using the searchable index and without accessing the set of backup data.

35. The computer program product as recited in claim 27 further comprising computer instructions for determining where a data object of interest that is responsive to the search query is located in the set of backup data using the searchable index and without accessing the set of backup data.

36. The computer program product as recited in claim 27, wherein the search result includes data associated with a non-responsive data object version related to a search responsive data object version, wherein the non-responsive data object version is not directly responsive to the search query.

37. The method as recited in claim 1, further comprising generating the searchable index, wherein generating the searchable index comprises generating data that indicates that the first data object is related to at least one other data object in the current production data or the set of backup data.

38. The system as recited in claim 16, wherein the processor is further configured to:
    generate the searchable index, wherein to generate the searchable index comprises to generate data that indicates that the first data object is related to at least one other data object in the current production data or the set of backup data.

39. The computer program product as recited in claim 27, further comprising generating the searchable index, wherein generating the searchable index comprises generating data that indicates that the first data object is related to at least one other data object in the current production data or the set of backup data.

* * * * *